(12) United States Patent
Tong et al.

(10) Patent No.: US 11,774,797 B2
(45) Date of Patent: Oct. 3, 2023

(54) BACKLIGHT SOURCE, BACKLIGHT MODULE AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Guangyun Tong, Beijing (CN); Shixin Geng, Beijing (CN); Lijin Zhao, Beijing (CN); Tengfei Wang, Beijing (CN); Jiangfeng Zhang, Beijing (CN); Xu Chen, Beijing (CN); Zhuolong Li, Beijing (CN); Yu Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 34 days.

(21) Appl. No.: 17/620,321

(22) PCT Filed: Feb. 4, 2021

(86) PCT No.: PCT/CN2021/075324
§ 371 (c)(1),
(2) Date: Dec. 17, 2021

(87) PCT Pub. No.: WO2021/164570
PCT Pub. Date: Aug. 26, 2021

(65) Prior Publication Data
US 2022/0244597 A1 Aug. 4, 2022

(30) Foreign Application Priority Data
Feb. 18, 2020 (CN) .......................... 202010099683.6

(51) Int. Cl.
*G02F 1/13357* (2006.01)
*G02F 1/1335* (2006.01)

(52) U.S. Cl.
CPC .. *G02F 1/133603* (2013.01); *G02F 1/133612* (2021.01)

(58) Field of Classification Search
CPC ........ G02F 1/133603; G02F 1/133601; G09G 2300/0426; G09G 3/3426
See application file for complete search history.

(56) References Cited

U.S. PATENT DOCUMENTS 8,598,603 B2 * 12/2013 Baba ................. G02F 1/133603
362/97.3
8,698,789 B2 * 4/2014 Park ..................... G02B 6/0068
362/229

(Continued)

FOREIGN PATENT DOCUMENTS

CN 101660692 A 3/2010
CN 102003640 A 4/2011

(Continued)

OTHER PUBLICATIONS

Office Action for application 202010099683.6 issued by the Chinese Intellectual Property Office dated Mar. 11, 2022.

*Primary Examiner* — Andrew J Coughlin
(74) *Attorney, Agent, or Firm* — IP & T GROUP LLP

(57) ABSTRACT

A backlight source includes light bars, adapter plate(s) and connection structures. Each light bar includes light-emitting group(s) and external connection unit(s). Each external connection unit is electrically connected to at least one light-emitting group and included at least one first electrode pair. Each adapter plate includes adapter circuits, each adapter circuit includes adapter units, each adapter unit includes at least one second electrode pair. Ends of each connection structure are electrically connected to one exter- (Continued)

nal connection unit and one adapter unit. All second electrode pairs of adapter units of a same adapter circuit are classified into at least one group, each group includes second electrode pairs electrically connected in series. In light-emitting groups electrically connected to adapter units of the same adapter circuit, light-emitting groups electrically connected second electrode pairs in a same group are connected in series to form a dimming region.

20 Claims, 8 Drawing Sheets

(56) References Cited

U.S. PATENT DOCUMENTS

| | | | |
|---|---|---|---|
| 2008/0088769 A1* | 4/2008 | Kim | G02B 6/0068 349/61 |
| 2010/0052564 A1 | 3/2010 | Park et al. | |
| 2011/0050111 A1 | 3/2011 | Tanaka et al. | |
| 2012/0113328 A1* | 5/2012 | Takeshima | H01L 33/647 257/88 |
| 2016/0037601 A1 | 2/2016 | Zhang et al. | |
| 2016/0155417 A1* | 6/2016 | Chen | H05B 45/46 315/122 |
| 2016/0377919 A1* | 12/2016 | Ning | G02F 1/133514 349/42 |
| 2017/0051904 A1 | 2/2017 | Tsai et al. | |
| 2022/0244597 A1* | 8/2022 | Tong | G02F 1/133603 |
| 2023/0132733 A1* | 5/2023 | Kimura | G02F 1/133603 349/64 |

FOREIGN PATENT DOCUMENTS

| | | |
|---|---|---|
| CN | 105247962 A | 1/2016 |
| CN | 204943192 U | 1/2016 |
| CN | 108761904 A | 11/2018 |
| CN | 110148355 A | 8/2019 |
| CN | 110658651 A | 1/2020 |
| CN | 111290171 A | 6/2020 |

* cited by examiner

G: (I)[1222(122/1)] - (I)[1221(122/1)] - (I)[1222(122/2)] - (I)[1221(122/2)] - ...
G: (II)[1222(122/1)] - (II)[1221(122/1)] - (II)[1222(122/2)] - (II)[1221(122/2)] - ...
G: (III)[1222(122/1)] - (III)[1221(122/1)] - (III)[1222(122/2)] - (III)[1221(122/2)] - ...
G: (IV)[1222(122/1)] - (IV)[1221(122/1)] - (IV)[1222(122/2)] - (IV)[1221(122/2)] - ...

BACKLIGHT SOURCE, BACKLIGHT MODULE AND DISPLAY APPARATUS

CROSS-REFERENCE TO RELATED APPLICATION

This application is a national phase entry under 35 USC 371 of International Patent Application No. PCT/CN2021/075324 filed on Feb. 4, 2021, which claims priority to Chinese Patent Application No. 202010099683.6, filed on Feb. 18, 2020, which are incorporated herein by reference in their entirety.

TECHNICAL FIELD

The present disclosure relates to the field of display technologies, in particular, to a backlight source, a backlight module and a display apparatus.

BACKGROUND

A backlight module is one of important components of a liquid crystal display apparatus. Existing backlight modules mainly include side-type backlight modules and direct-type backlight modules. Since light-emitting diodes (LEDs) are evenly arranged on a back of a panel in a direct-type backlight module, backlight may be evenly transmitted to an entire screen. Thus, details of an image are delicate and realistic.

In a design process of the direct-type backlight module, local dimming technology is usually used. Local dimming means that a backlight source of a backlight module is divided into a plurality of small regions, and brightness of a small region is separately adjusted according to a gray scale of displayed content corresponding to the small region, so as to achieve purposes of saving energy, increasing contrast, preventing light leakage, and the like.

SUMMARY

In an aspect, a backlight source is provided. The backlight source includes a plurality of light bars, at least one adapter plate and a plurality of connection structures. Each light bar includes at least one light-emitting group, each light-emitting group including at least two light-emitting devices connected in series, and at least one external connection unit, each external connection unit being electrically connected to at least one light-emitting group in the light bar. The external connection unit includes at least one first electrode pair in one-to-one correspondence with the at least one light-emitting group electrically connected to the external connection unit. Each adapter plate includes a plurality of adapter circuits, and each adapter circuit includes at least two adapter units in electrical connection. Each adapter unit including at least one second electrode pair in one-to-one correspondence with the at least one first electrode pair. Each connection structure corresponds to one external connection unit and one adapter unit in an adapter circuit. An end of the connection structure is electrically connected to the corresponding external connection unit, and another end thereof is electrically connected to the corresponding adapter unit, so that at least one light-emitting group electrically connected to each first electrode pair of the external connection unit is electrically connected to a corresponding second electrode pair of the adapter unit. Second electrode pairs of at least two adapter units of a same adapter circuit are classified into at least one group, each group includes at least two second electrode pairs that are electrically connected in series in sequence, each of the at least two second electrode pairs is from a respective adapter unit. In light-emitting groups electrically connected to the at least two adapter units of the same adapter circuit, light-emitting groups electrically connected to at least two second electrode pairs in a same group are connected in series to form a dimming region.

In some embodiments, the light-emitting group has an anode terminal and a cathode terminal. Each first electrode pair includes an external connection anode and an external connection cathode. The anode terminal of the light-emitting group is electrically connected to an external connection anode of a corresponding first electrode pair, and the cathode terminal of the light-emitting group is electrically connected to an external connection cathode of the corresponding first electrode pair.

In some embodiments, the connection structure includes a first connection unit and a second connection unit electrically connected to the first connection unit. The first connection unit is electrically connected to the corresponding external connection unit, and the second connection unit is electrically connected to the corresponding adapter unit.

In some embodiments, each second electrode pair includes an adapter anode and an adapter cathode. The first connection unit includes at least one first connection electrode pair in one-to-one correspondence with the at least one first electrode pair included in the corresponding external connection unit, and each first connection electrode pair includes a first connection anode and a first connection cathode. The second connection unit includes at least one second connection electrode pair in one-to-one correspondence with the at least one second electrode pair included in the corresponding adapter unit, and each second connection electrode pair includes a second connection anode and a second connection cathode. The first connection anode of the first connection electrode pair is electrically connected to a second connection anode of a corresponding second connection electrode pair, and the first connection cathode of the first connection electrode pair is electrically connected to a second connection cathode of the corresponding second connection electrode pair. The first connection anode of the first connection electrode pair is electrically connected to an external connection anode of a corresponding first electrode pair, and the first connection cathode of the first connection electrode pair is electrically connected to an external connection cathode of the corresponding first electrode pair. The second connection anode of the second connection electrode pair is electrically connected to an adapter anode of a corresponding second electrode pair, and the second connection cathode of the second connection electrode pair is electrically connected to an adapter cathode of the corresponding second electrode pair.

In some embodiments, the adapter circuit further includes a power supply connection unit, and two adapter units of the at least two adapter units included in the adapter circuit are electrically connected to the power supply connection unit. The power supply connection unit is configured to control light-emitting devices in the dimming region to emit light.

In some embodiments, the power supply connection unit and the at least two adapter units are disposed on two opposite sides of an adapter plate including the power supply connection unit in a thickness direction thereof.

In some embodiments, each second electrode pair includes an adapter anode and an adapter cathode, the power supply connection unit includes at least one power supply electrode pair in one-to-one correspondence with at least one second electrode pair included in any of the two adapter units electrically connected to the power supply connection unit, and each power supply electrode pair includes a power supply anode and a power supply cathode. The two adapter units electrically connected to the power supply connection unit are a first adapter unit and a second adapter unit. An adapter anode of a second electrode pair in the first adapter unit is electrically connected to an adapter cathode of a corresponding second electrode pair in the second adapter unit. The power supply cathode of the power supply electrode pair is electrically connected to an adapter cathode of a corresponding second electrode pair in the first adapter unit, and the power supply anode of the power supply electrode pair is electrically connected to an adapter anode of a corresponding second electrode pair in the second adapter unit.

In some embodiments, each light bar extends in a first direction, and the plurality of light bars are arranged in a second direction. The first direction intersects with the second direction. The adapter plate extends in the second direction. The adapter plate is located under the plurality of light bars, or the adapter plate is located on a side of the plurality of light bars in the first direction.

In some embodiments, the light-emitting groups electrically connected to the at least two adapter units of the same adapter circuit are arranged in at least two light bars that are adjacent in the second direction.

In some embodiments, the light bar includes at least one light segment, and each light segment includes the at least one light-emitting group electrically connected to an external connection unit. Each light segment corresponds to the external connection unit. The external connection unit is disposed in a middle of the corresponding light segment in the first direction.

In some embodiments, the light-emitting group has an anode terminal and a cathode terminal. The light-emitting group further includes a first connection line and a second connection line. The anode terminal of the light-emitting group is electrically connected to a corresponding external connection unit through the first connection line, and the cathode terminal of the light-emitting group is electrically connected to the corresponding external connection unit through the second connection line. The at least one light-emitting group electrically connected to a same external connection unit includes a plurality of light-emitting groups, sectional areas of a first connection line and a second connection line of a light-emitting group closer to the external connection unit are smaller.

In some embodiments, the light-emitting devices are light-emitting diodes, and in a same light bar, colors of light emitted by two adjacent light-emitting devices are different.

In some embodiments, in a plane where the backlight source is located, fixing directions of two adjacent light bars differ by 180°.

In some embodiments, each light bar further includes a direction mark disposed on a surface of the light bar, and directions indicated by direction marks of the two adjacent light bars are opposite.

In some embodiments, colors of light emitted by light-emitting devices, located in a same column along a second direction, in the two adjacent light bars are different, the second direction is a direction in which the plurality of light bars are arranged.

In some embodiments, a number of light-emitting devices included in each light bar is an even number.

In some embodiments, the connection structure is a converter, a flexible printed circuit, or a flexible flat cable.

In another aspect, a backlight module is provided. The backlight module includes the backlight source according to any one of the above embodiments and a back frame. The backlight source is located in the back frame. In a case where the at least one adapter plate of the backlight source is located under the plurality of light bars of the backlight source, the back frame includes at least one depression, and each adapter plate is located in a corresponding depression.

In yet another aspect, a display apparatus is provided. The display apparatus includes the backlight module according to the above embodiments.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods and actual timings of signals to which the embodiments of the present disclosure relate.

DETAILED DESCRIPTION

Figure 1:
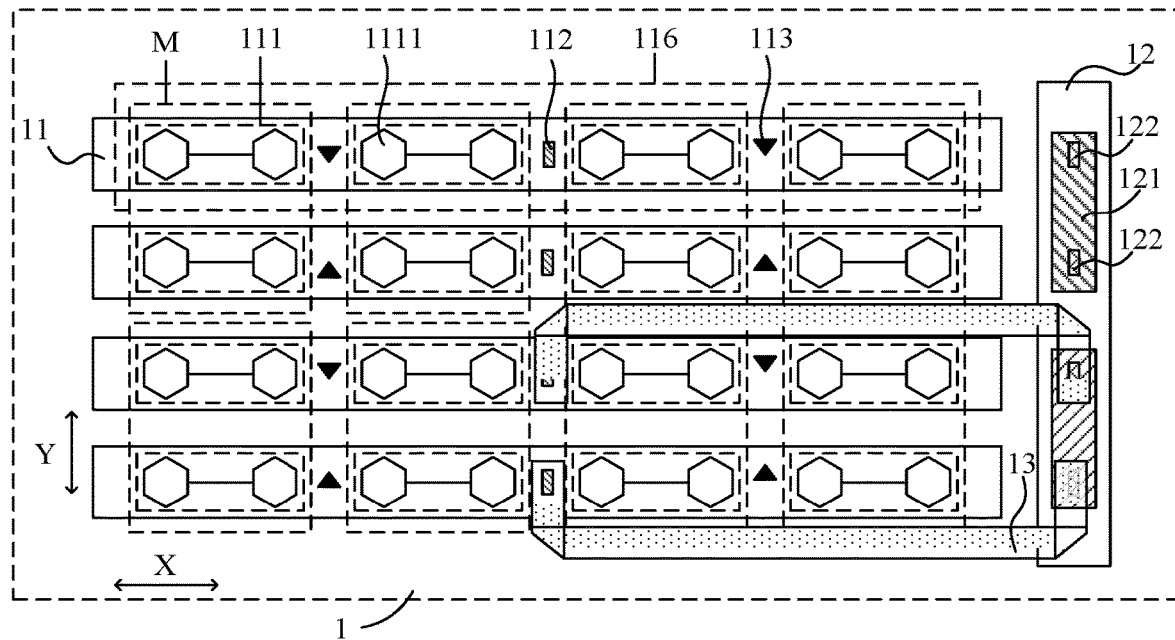
FIG. 1 is a diagram showing a structure of a backlight source, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to." In the description, the term such as "one embodiment", "some embodiments", "exemplary embodiments", "example", "specific example" or "some examples" is intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, features defined as "first" or "second" may explicitly or implicitly include one or more of the features. In the description of the embodiments of the present disclosure, the term "a plurality of" or "the plurality of" means two or more unless otherwise specified.

In the description of embodiments of the present disclosure, it will be understood that, orientations or positional relationships indicated by the terms such as "center", "upper", "lower", "front", "rear", "left", "right", "vertical", "horizontal", "top", "bottom", "inner" and "outer" are based on orientations or positional relationships shown in the drawings. They are merely to facilitate and simplify the description of the embodiments of the present disclosure, and are not to indicate or imply that the indicated devices or elements each must have a particular orientation, or each must be constructed or operated in a particular orientation. Therefore, they should not be construed as limitations on the embodiments of the present disclosure.

In the description of the embodiments of the present disclosure, it will be noted that, the terms "installed", "connected" and "connection" should be understood in a general sense unless otherwise explicitly specified and limited. For example, it may be a fixed connection, a detachable connection, or an integral connection; it may be a direct connection, an indirect connection through an intermediate medium, or an internal connection between two elements. A person of ordinary skill in the art may understand specific meanings of the above terms in the present disclosure according to specific situations.

First, several terms involved in the embodiments of the present disclosure will be introduced and explained.

A light bar is a structure formed by arranging a plurality of light-emitting devices (e.g., light-emitting diode (LED) chips) in a row and fixing the light-emitting devices on a printed circuit board (PCB).

A lamp panel is a structure formed by fixing a plurality of rows of light-emitting devices (e.g., LED chips) on a PCB.

In the related art, in order to achieve local dimming of a direct-type backlight module, a backlight source of the backlight module needs to be partitioned. Although a good local dimming effect may be realized by fixing LEDs on a PCB lamp panel, in order to reduce costs of LEDs, there is a certain distance between adjacent rows of LEDs, which wastes a large area of the PCB of the lamp panel, and thus causes excessively high costs. By means of light bars, several LEDs in a light bar are used as a dimming region. If there are a large number of LEDs in the dimming region, although costs of driving the LEDs may be effectively reduced, the LEDs in the light bar form a strip-shaped dimming region, which is disadvantageous for the local dimming effect. If there are a small number of LEDs in the dimming region, although a good local dimming effect may be achieved, the driving costs greatly increases.

Some embodiments of the present disclosure provide a backlight source. As shown in FIG. 1, the backlight source 1 includes a plurality of light bars 11, at least one adapter plate 12 and a plurality of connection structures 13.

Figure 2:
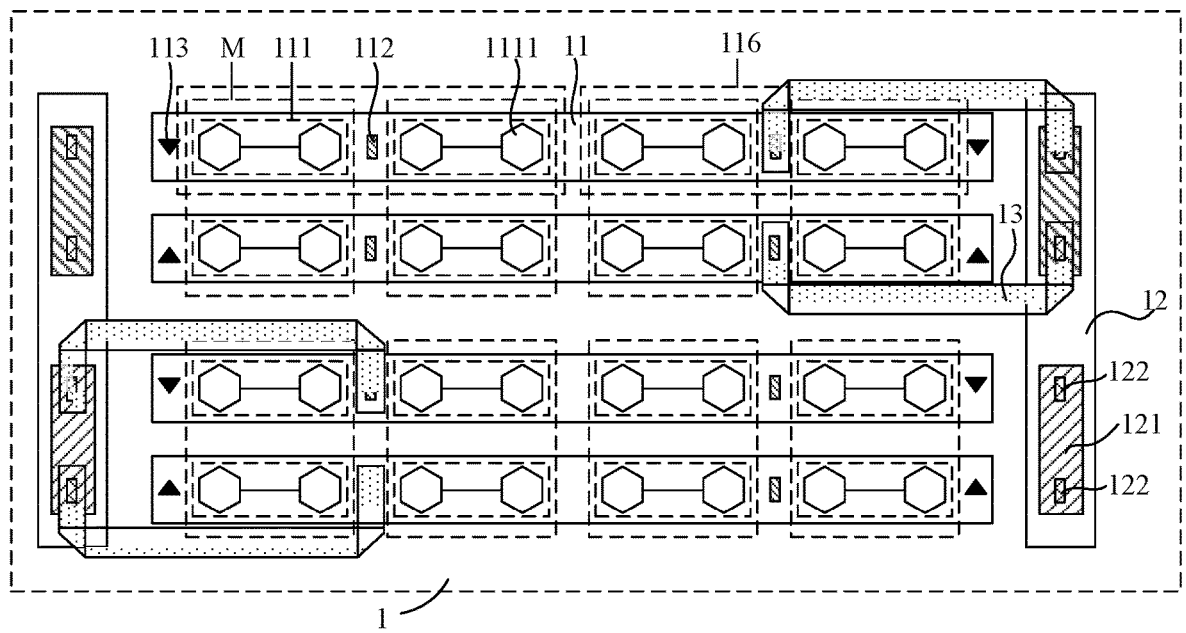
FIG. 2 is a diagram showing a structure of another backlight source, in accordance with some embodiments.
Figure 3:
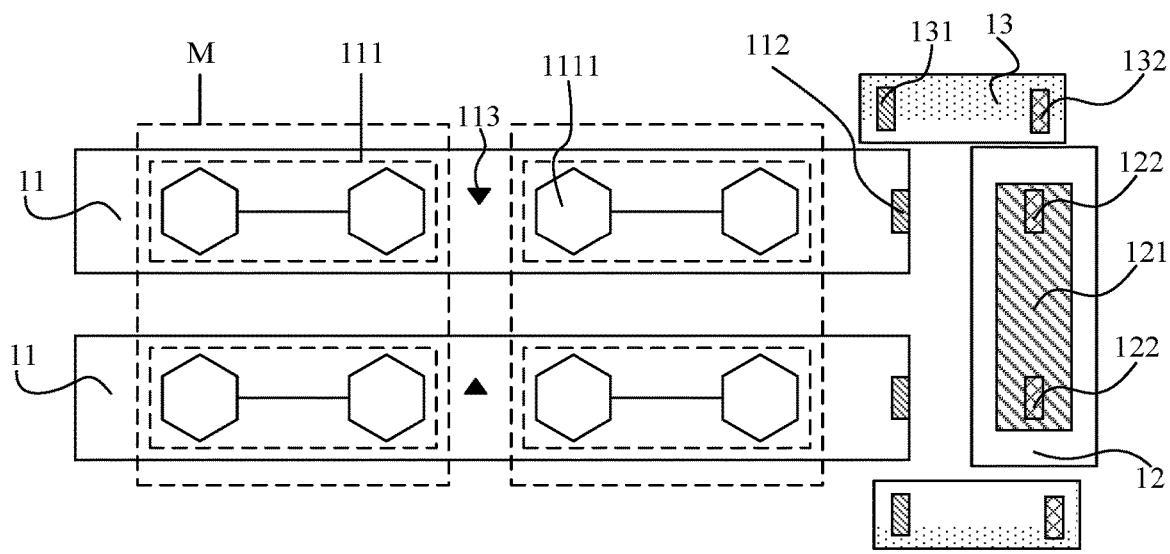
FIG. 3 is a diagram of showing a split structure of light bars, an adapter plate and connection structures of a backlight source, in accordance with some embodiments.

The numbers of the light bars 11, the adapter plate(s) 12 and the connection structures 13 are not limited in the present disclosure. In some embodiments, two, three, four or more than four light bars 11 may be provided, FIGS. 1 and 2 show four light bars, and FIG. 3 shows two light bars; one, two or more than two adapter plates 12 may be provided, FIG. 1 shows one adapter plate, and FIG. 2 shows two adapter plates; two, three, four or more than four connection structures 13 may be provided, and FIG. 3 shows two connection structures.

In some embodiments, as shown in FIG. 1, each light bar 11 extends in a first direction X, and the plurality of light bars 11 are arranged in a second direction Y, and the adapter plate 12 extends in the second direction Y. The first direction X intersects with the second direction Y. For example, the first direction X is perpendicular to the second direction Y.

Figure 4:
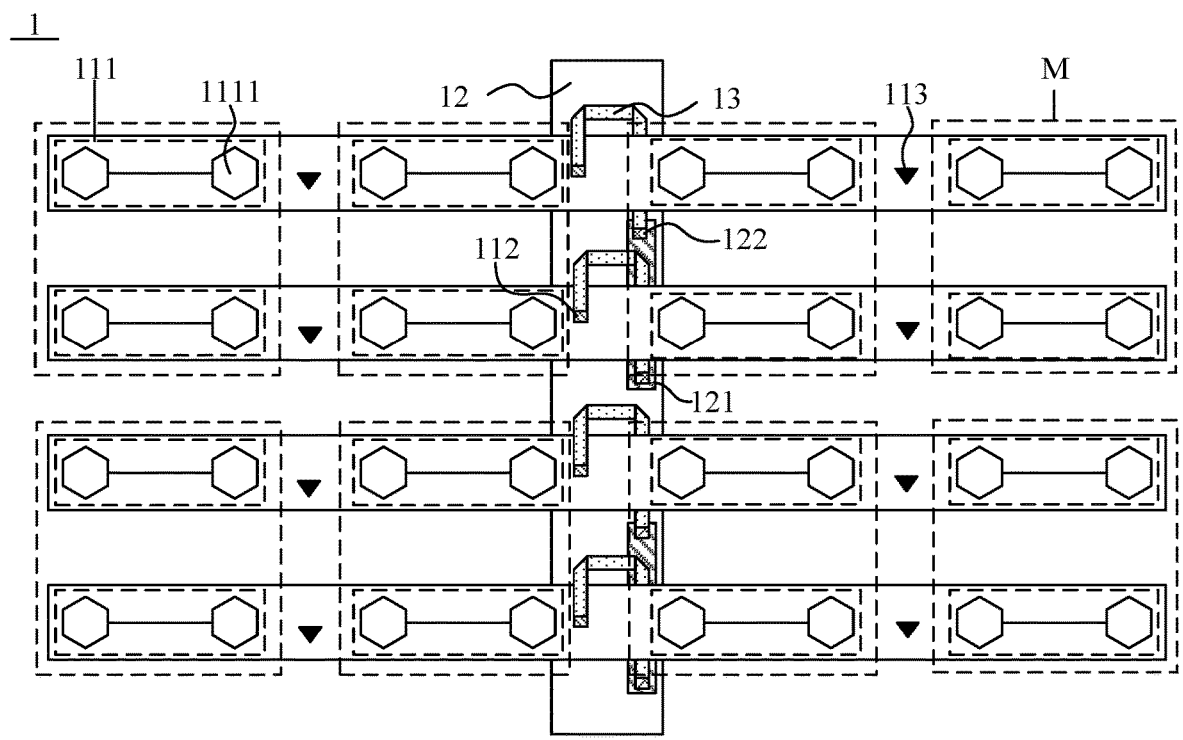
FIG. 4 is a diagram showing a structure of yet another backlight source, in accordance with some embodiments.

In some embodiments, as shown in FIG. 4, the adapter plate 12 is located below the plurality of light bars 11, so that an area of a peripheral region of a display apparatus may be reduced, and a demand for a narrow bezel may be met. Or, as shown in FIG. 1, the adapter plate 12 is located on a side of the plurality of light bars 11 in the first direction X, so that it is beneficial to reducing a thickness of the backlight source, thereby reducing a thickness of the display apparatus, and meeting a demand for lightness and thinness.

Each light bar 11 includes at least one light-emitting group 111 and at least one external connection unit 112. The numbers of the light-emitting group(s) 111 and the external connection unit(s) 112 are not limited in the present disclosure. In some embodiments, one, two or more than two light-emitting groups 111 may be provided, FIG. 1 shows four light-emitting groups 111, and FIG. 3 shows two light-emitting groups 111; one, two or more than two external connection units 112 may be provided, and FIG. 2 shows two external connection units.

A position of the external connection unit 112 in the light bar 11 is not limited in the present disclosure either. As shown in FIGS. 1 to 3, the external connection unit 112 may be located between any two adjacent light-emitting groups 111, or may be located at an end of the light bar 11.

In order to avoid a large difference between distances between the light-emitting groups 111 and the external connection unit 112, and in turn to reduce an influence of IR drop on brightness of each light-emitting device 1111 in the light bar 11, in some embodiments, as shown in FIGS. 1 to 2, the light bar 11 includes at least one light segment 116. Each light segment 116 includes at least one light-emitting group 111, and corresponds to one external connection unit 112. Light-emitting group(s) 111 included in a same light segment 116 are all electrically connected to a corresponding external connection unit 112, and distances between the external connection unit 112 and both ends of the corresponding light segment 116 are equal.

For example, as shown in FIG. 1, the light bar 11 includes one light segment 116. The light segment 116 includes four light-emitting groups 111, and corresponds to one external connection unit 112. The four light-emitting groups 111 included in the light segment 116 are all electrically connected to the corresponding external connection unit 112. The external connection unit 112 is located in a middle of the four light-emitting groups 111 electrically connected thereto. That is, it is located between a third light-emitting group 111 and a second light-emitting group 111 in the four light-emitting groups 111 (the four light-emitting groups 111 being numbered in an order from left to right), so that distances between the external connection unit 112 and both ends of the light segment 116 are equal.

For example, the light bar 11 includes a plurality of light segments. For example, as shown in FIG. 2, the light bar 11 includes two light segments 116, each of which includes two light-emitting groups 111 and corresponds to one external connection unit 112. The two light-emitting groups 111 included in a same light segment 116 are both electrically connected to the corresponding external connection unit 112. The external connection unit 112 is located in a middle of the two light-emitting groups 111 electrically connected thereto, so that distances between the external connection unit 112 and both ends of the corresponding light segment 116 are equal.

Each light-emitting group 111 includes at least two light-emitting devices 111 connected in series. The number of the light-emitting devices 1111 connected in series in each light-emitting group 111 is not limited in the embodiments of the present disclosure. In some embodiments, two, three or more than three light-emitting devices 1111 connected in series may be provided.

Each external connection unit 112 is electrically connected to at least one light-emitting group 111 of light-emitting groups 111 included in the light bar 11.

In some embodiments, as shown in FIG. 1, the light bar 11 includes one external connection unit 112, and the external connection unit 112 is electrically connected to the four light-emitting groups 111 included in the light bar 11. In some embodiments, the light bar 11 includes a plurality of external connection units 112. For example, as shown in FIG. 2, the light bar 11 includes two external connection units 112, and each external connection unit 112 is electrically connected to two light-emitting groups 111 of four light-emitting groups 111 included in the light bar 11.

Each adapter plate 12 includes a plurality of adapter circuits 121, and each adapter circuit 121 includes at least two adapter units 122 in electrical connection.

In the embodiments of the present disclosure, the numbers of the adapter circuits 121 and the adapter units 122 in electrical connection included in each adapter circuit 121 are not limited. In some embodiments, two, three or more than three adapter circuits 121 may be provided, and FIG. 1 shows two adapter circuits; two, three or more than three adapter units 122 in electrical connection included in each adapter circuit 121 may be provided, and FIG. 1 shows two adapter units. For example, if each adapter plate 12 includes P adapter circuits 121, and each adapter circuit 121 includes Q adapter units, then P light bars 11 connected in series with each adapter circuit 121 are provided, and P by Q (i.e., P×Q) light bars included in the backlight source 1 are provided.

Figure 7:
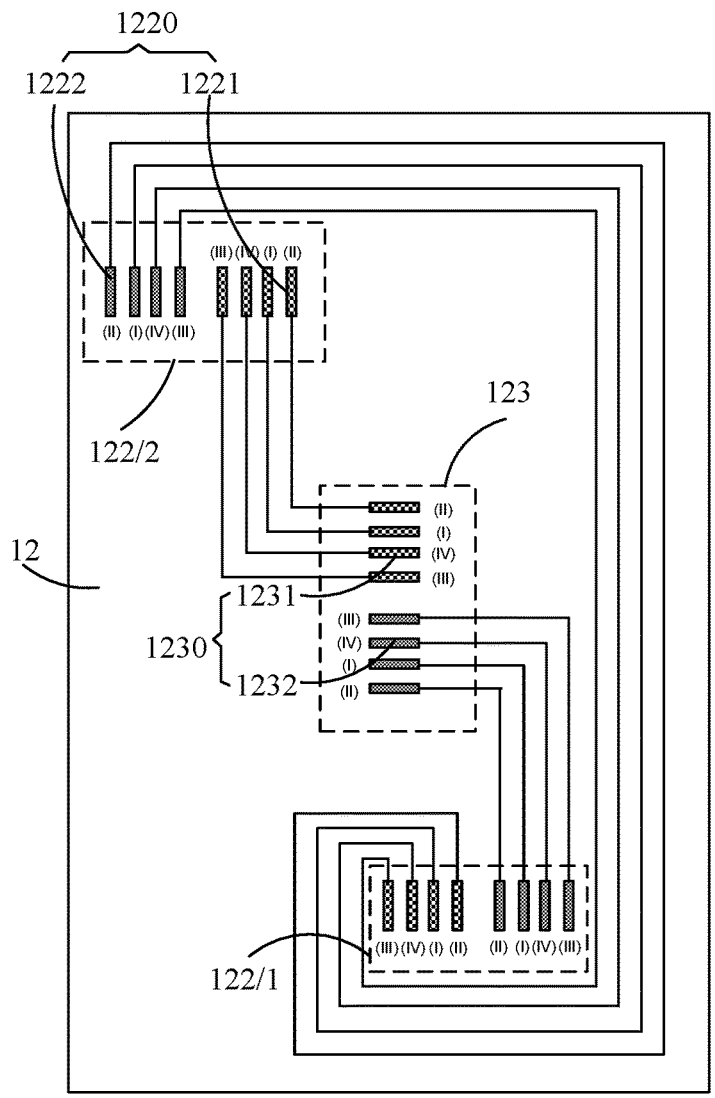
FIG. 7 is a diagram showing a structure of an adapter circuit in an adapter plate matched with the light bars shown in FIG. 6, in accordance with some embodiments.

As shown in FIG. 1, each connection structure 13 corresponds to one external connection unit 112 and one adapter unit 122 in an adapter circuit 121. An end of the connection structure 13 is electrically connected to the corresponding external connection unit 112, and the other end of the connection structure 13 is electrically connected to the corresponding adapter unit 122, so that the at least one light-emitting group 111 electrically connected to the external connection unit 112 is electrically connected to the corresponding adapter unit 122. Each external connection unit 112 includes at least one first electrode pair 1120 in one-to-one correspondence with the at least one light-emitting group 111 electrically connected to the external connection unit 112, and each adapter unit 122 includes at least one second electrode pair 1220 in one-to-one correspondence with the at least one first electrode pair 1120. As shown in FIG. 7, second electrode pairs 1220 of at least two adapter units 122 of a same adapter circuit 121 are classified into at least one group G, each group G includes at least two second electrode pairs 1220 that are electrically connected in series in sequence, each of the at least two second electrode pairs 1220 is from a respective adapter unit 122. In light-emitting groups 111 electrically connected to the at least two adapter units 122 of the same adapter circuit 121, light-emitting groups 111 electrically connected to at least two second electrode pairs 1220 in a same group G are connected in series to form a dimming region M.

A description will be given by taking an example in which each adapter circuit 121 includes two adapter units 122, that is, each adapter circuit 121 is connected in series with two light bars 11. In some embodiments, as shown in FIG. 1, in two light bars 11 electrically connected to two adapter units 122 in the same adapter circuit 121, light-emitting groups 111 at a same position (located in a same column along a second direction Y) of the two light bars 11 are connected in series to form a dimming region M. For example, the plurality of light bars 11 are numbered in an order from top to bottom, and the light-emitting groups 111 on each light bar 11 are numbered in an order from left to right. A third light bar 11 and a fourth light bar 11 are electrically connected to two adapter units 122 in the same adapter circuit 121. A first light-emitting group 111 on the third light bar 11 and a first light-emitting group 111 on the fourth light bar 11 are connected in series to form a dimming region M. A second light-emitting group 111 on the third light bar 11 and a second light-emitting group 111 on the fourth light bar 11 are connected in series to form another dimming region M.

It will be noted that, in order to clearly show the external connection units 112 and the adapter units 122, in FIGS. 1 to 2, some external connection units 112 are not connected to corresponding adapter units 122 through connection structures 13.

In the backlight source 1 provided by some embodiments of the present disclosure, corresponding light-emitting groups 111 in adjacent light bars are connected in series. By controlling the number of the light-emitting devices 1111 in each light-emitting group 111 and the number of light-emitting groups 111 connected in series in a single dimming region M, a shape and a size of the dimming region M may be flexibly controlled to meet different display demands. Compared with a manner in which the light-emitting devices are fixed on the PCB, the above design solution of the light bars 11 and the adapter plate(s) 12 may reduce costs significantly.

Figure 6:
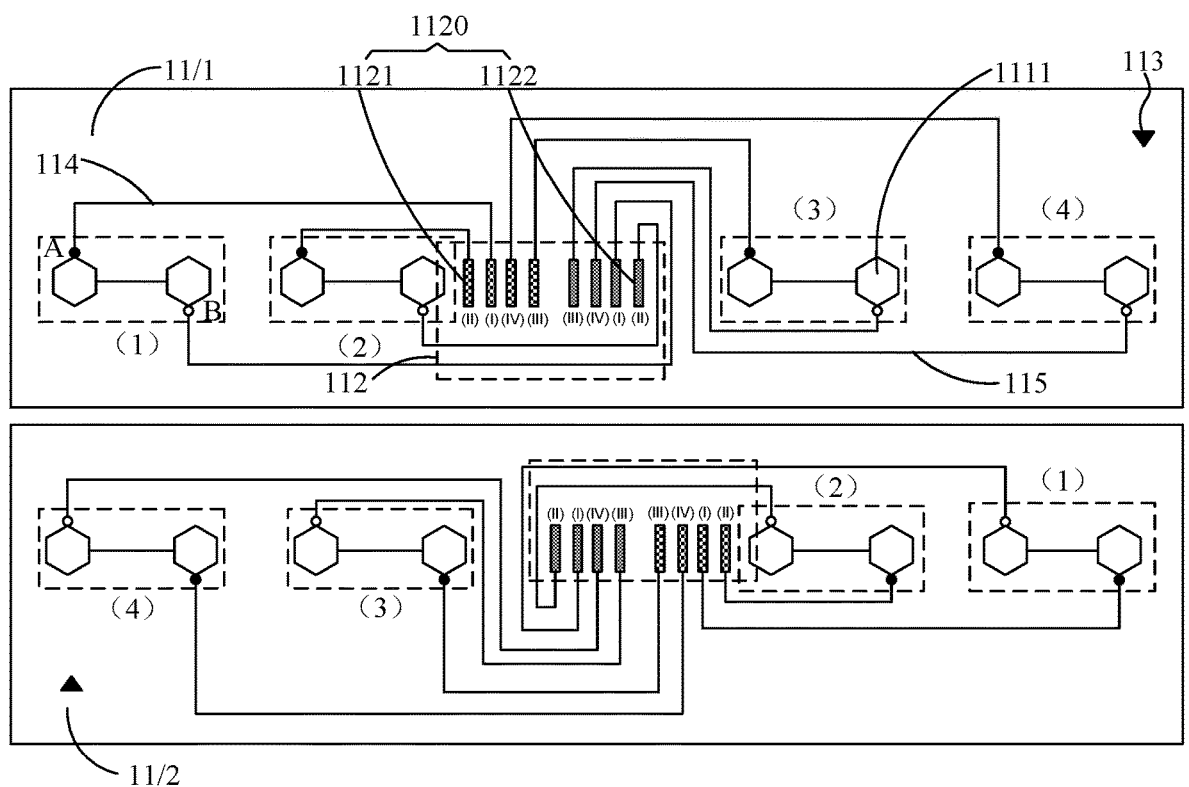
FIG. 6 is a diagram showing structures of two adjacent light bars in a backlight source, in accordance with some embodiments.

In order to achieve electrical connection between each light-emitting group 111 and a corresponding external connection unit 112 that are located in the light bar 11, in some embodiments, as shown in FIG. 6, the light-emitting group 111 has an anode terminal A and a cathode terminal B. The external connection unit 112 includes at least one first electrode pair 1120 in one-to-one correspondence with the at least one light-emitting group 111 electrically connected to the external connection unit 112. Each first electrode pair 1120 includes an external connection anode 1121 and an external connection cathode 1122. The anode terminal A of each light-emitting group 111 is electrically connected to an external connection anode 1121 of a corresponding first electrode pair, and the cathode terminal B of the light-emitting group 111 is electrically connected to an external connection cathode 1122 of the corresponding first electrode pair.

A description will be given by taking an example in which the light bar 11 includes four light-emitting groups 111 and one external connection unit 112.

Each light-emitting group 111 has an anode terminal A and a cathode terminal B. The external connection unit 112 includes four first electrode pairs in one-to-one correspondence with the four light-emitting groups 111 electrically connected to the external connection unit 112. Each first electrode pair includes an external connection anode 1121 and an external connection cathode 1122. The anode terminal A of each light-emitting group 111 is electrically connected to an external connection anode 1121 of a corresponding first electrode pair, and the cathode terminal B of the light-emitting group 111 is electrically connected to an external connection cathode 1122 of the corresponding first electrode pair.

For example, the four light-emitting groups 111 are a first light-emitting group (1), a second light-emitting group (2), a third light-emitting group (3) and a fourth light-emitting group (4). Serial numbers of the four first electrode pairs are (I), (II), (III) and (IV).

An anode terminal A of the first light-emitting group (1) is electrically connected to an external connection anode 1121 of the first electrode pair (I), and a cathode terminal B thereof is electrically connected to an external connection cathode 1122 of the first electrode pair (I).

An anode terminal A of the second light-emitting group (2) is electrically connected to an external connection anode 1121 of the first electrode pair (II), and a cathode terminal B thereof is electrically connected to an external connection cathode 1122 of the first electrode pair (II).

An anode terminal A of the third light-emitting group (3) is electrically connected to an external connection anode 1121 of the first electrode pair (III), and a cathode terminal B thereof is electrically connected to an external connection cathode 1122 of the first electrode pair (III).

An anode terminal A of the fourth light-emitting group (4) is electrically connected to an external connection anode 1121 of the first electrode pair (IV), and a cathode terminal B thereof is electrically connected to an external connection cathode 1122 of the first electrode pair (IV).

By using the above connection method, the anodes and the cathodes of the light-emitting groups 111 are led to the external connection unit 112.

In some embodiments, as shown in FIG. 6, the light-emitting group 111 further includes a first connection line 114 and a second connection line 115. The anode terminal A of the light-emitting group 111 is electrically connected to the corresponding external connection unit 112 through the first connection line 114, and the cathode terminal B thereof is electrically connected to the corresponding external connection unit 112 through the second connection line 115. In light-emitting groups 111 electrically connected to a same external connection unit 112, a sectional area of a first connection line 114 of a light-emitting group 111 closer to the external connection unit 112 is smaller, and a sectional area of a second connection line 115 of the light-emitting group 111 closer to the external connection unit 112 is smaller.

For example, as shown in FIG. 6, in the four light-emitting groups 111 electrically connected to the external connection unit 112, the second light-emitting group (2) and the third light-emitting group (3) are closer to the external connection unit 112 than the first light-emitting group (1) and the fourth light-emitting group (4). Sectional areas of first connection lines 114 of the second light-emitting group (2) and the third light-emitting group (3) are smaller than sectional areas of first connection lines 114 of the first light-emitting group (1) and the fourth light-emitting group (4). And, sectional areas of second connection lines 115 of the second light-emitting group (2) and the third light-emitting group (3) are smaller than sectional areas of second connection lines 115 of the first light-emitting group (1) and the fourth light-emitting group (4).

In this way, by designing widths of the first connection lines 114 and the second connection lines 115, resistances of the first connection lines 114 and the second connection lines 115 that are electrically connected to the light-emitting groups 111 are substantially equal. As a result, it is possible to avoid affecting brightness of the light-emitting devices 1111 in the light-emitting groups 111 due to the IR drop, and a display effect of the display apparatus may be improved.

In order to achieve electrical connection between an external connection unit 112 and a corresponding adapter unit 122, in some embodiments, as shown in FIG. 3, the connection structure 13 includes a first connection unit 131 and a second connection unit 132 electrically connected to the first connection unit 131. The first connection unit 131 is electrically connected to the corresponding external connection unit 112, and the second connection unit 132 is electrically connected to the corresponding adapter unit 122.

Figure 9:
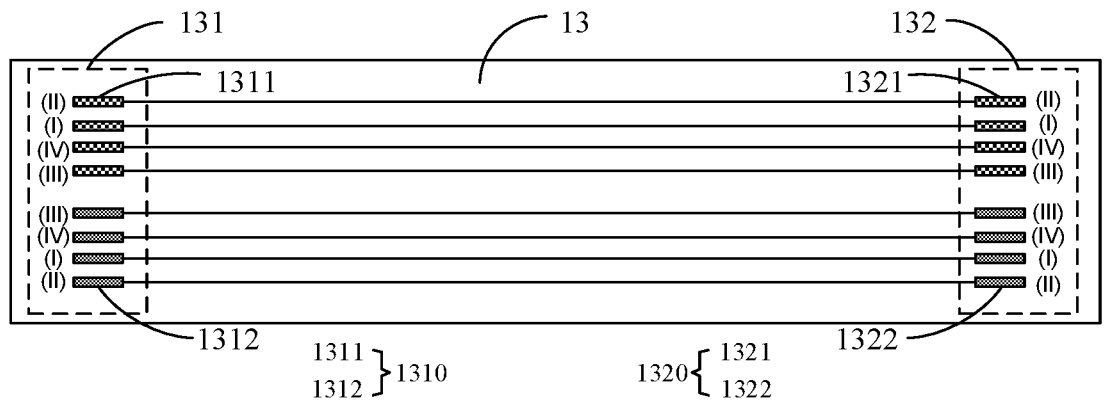
FIG. 9 is a diagram showing an unfolded structure of a connection structure, in accordance with some embodiments.
Figure 10:
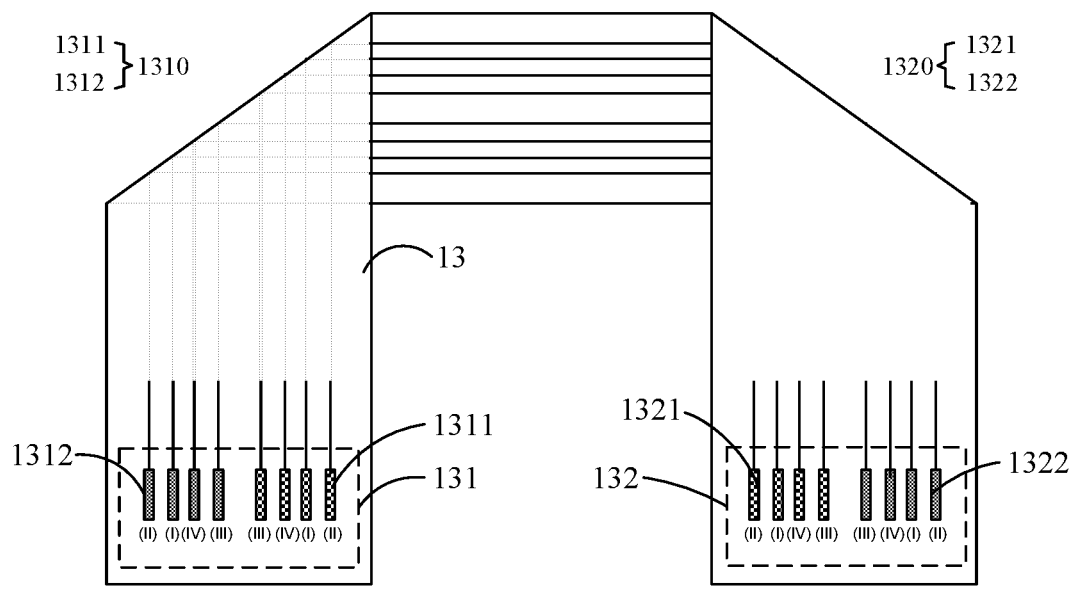
FIG. 10 is a diagram showing a folded structure of the connection structure shown in FIG. 9.

In order to achieve electrical connection between the connection structure 13 and the external connection unit 112, in some embodiments, as shown in FIGS. 9 and 10, the first connection unit 131 includes at least one first connection electrode pair 1310 in one-to-one correspondence with the at least one first electrode pair included in the external connection unit 112. Each first connection electrode pair 1310 includes a connection anode and a connection cathode. The connection anode of the first connection electrode pair is electrically connected to an external connection anode 1121 of a corresponding first electrode pair, and the connection cathode of the first connection electrode pair is electrically connected to an external connection cathode 1122 of the corresponding first electrode pair.

Hereinafter, the connection anode of the first connection electrode pair 1310 is referred to as a first connection anode 1311, and the connection cathode thereof is referred to as a first connection cathode 1312.

For example, the first connection unit 131 includes four first connection electrode pairs (I), (II), (III) and (IV) in one-to-one correspondence with the four first electrode pairs (I), (II), (III) and (IV) included in the external connection unit 112. Each first connection electrode pair includes a first connection anode 1311 and a first connection cathode 1312.

A first connection anode 1311 of the first connection electrode pair (I) is electrically connected to the external connection anode 1121 of the first electrode pair (I), and a first connection cathode 1312 of the first connection electrode pair (I) is electrically connected to the external connection cathode 1122 of the first electrode pair (I).

A first connection anode 1311 of the first connection electrode pair (II) is electrically connected to the external connection anode 1121 of the first electrode pair (II), and a first connection cathode 1312 of the first connection electrode pair (II) is electrically connected to the external connection cathode 1122 of the first electrode pair (II).

A first connection anode 1311 of the first connection electrode pair (III) is electrically connected to the external connection anode 1121 of the first electrode pair (III), and a first connection cathode 1312 of the first connection electrode pair (III) is electrically connected to the external connection cathode 1122 of the first electrode pair (III).

A first connection anode 1311 of the first connection electrode pair (IV) is electrically connected to the external connection anode 1121 of the first electrode pair (IV), and a first connection cathode 1312 of the first connection electrode pair (IV) is electrically connected to the external connection cathode 1122 of the first electrode pair (IV).

In order to achieve electrical connection between the first connection unit 131 and the second connection unit 132, the second connection unit 132 includes at least one second connection electrode pair 1320 in one-to-one correspondence with the at least one first connection electrode pair 1310 included in the first connection unit 131. Each second connection electrode 1320 includes a connection anode and a connection cathode. The connection anode of the first connection electrode pair is electrically connected to a connection anode of a corresponding second connection electrode pair, and the connection cathode of the first connection electrode pair is electrically connected to a connection cathode of the corresponding second connection electrode pair.

In order to distinguish from the connection anode and the connection cathode of the first connection electrode pair, hereinafter, the connection anode of the second connection electrode pair 1320 is referred to as a second connection anode 1321, and the connection cathode thereof is referred to as a second connection cathode 1322.

For example, the second connection unit 132 includes four second connection electrode pairs (I), (II), (III) and (IV) in one-to-one correspondence with the four first connection electrode pairs (I), (II), (III) and (IV) included in the first connection unit 131. Each second connection electrode pair includes a second connection anode 1321 and a second connection cathode 1322.

The first connection anode 1311 of the first connection electrode pair (I) is electrically connected to a second connection anode 1321 of the second connection electrode pair (I), and the first connection cathode 1312 of the first connection electrode pair (I) is electrically connected to a second connection cathode 1322 of the second connection electrode pair (I).

The first connection anode 1311 of the first connection electrode pair (II) is electrically connected to a second connection anode 1321 of the second connection electrode pair (II), and the first connection cathode 1312 of the first connection electrode pair (II) is electrically connected to a second connection cathode 1322 of the second connection electrode pair (II).

The first connection anode 1311 of the first connection electrode pair (III) is electrically connected to a second connection anode 1321 of the second connection electrode pair (III), and the first connection cathode 1312 of the first connection electrode pair (III) is electrically connected to a second connection cathode 1322 of the second connection electrode pair (III).

The first connection anode 1311 of the first connection electrode pair (IV) is electrically connected to a second connection anode 1321 of the second connection electrode pair (IV), and the first connection cathode 1312 of the first connection electrode pair (IV) is electrically connected to a second connection cathode 1322 of the second connection electrode pair (IV).

By using the above connection method, the anodes and the cathodes of the light-emitting groups 111 are led to the external connection unit 112, and are further led to the connection structure 13.

In order to achieve electrical connection between a connection structure 13 and an adapter unit 122, in some embodiments, as shown in FIG. 7, the adapter unit 122 includes at least one second electrode pair 1220 in one-to-one correspondence with at least one light-emitting group 111 electrically connected to the adapter unit 122. That is, the adapter unit 122 includes the second electrode pair 1220 in one-to-one correspondence with at least one second connection electrode pair included in the second connection unit 132. Each second electrode pair 1220 includes an adapter anode 1221 and an adapter cathode 1222. The connection anode of the second connection electrode is electrically connected to an adapter anode 1221 of a corresponding second electrode pair, and the connection cathode of the second connection electrode pair is electrically connected to an adapter cathode 1222 of the corresponding second electrode pair.

For example, the adapter unit 122 includes four second electrode pairs in one-to-one correspondence with four light-emitting groups 111 electrically connected to the adapter unit 122. Each second electrode pair includes an adapter anode 1221 and an adapter cathode 1222. The four light-emitting groups 111 are a first light-emitting group (1), a second light-emitting group (2), a third light-emitting group (3) and a fourth light-emitting group (4). Serial numbers of the four second electrode pairs are (I), (II), (III) and (IV).

The second connection anode 1321 of the second connection electrode pair (I) is electrically connected to an adapter anode 1221 of the second electrode pair (I), and the second connection cathode 1322 of the second connection electrode pair (I) is electrically connected to an adapter cathode 1222 of the second electrode pair (I).

The second connection anode 1321 of the second connection electrode pair (II) is electrically connected to an adapter anode 1221 of the second electrode pair (II), and the second connection cathode 1322 of the second connection electrode pair (II) is electrically connected to an adapter cathode 1222 of the second electrode pair (II).

The second connection anode 1321 of the second connection electrode pair (III) is electrically connected to an adapter anode 1221 of the second electrode pair (III), and the second connection cathode 1322 of the second connection electrode pair (III) is electrically connected to an adapter cathode 1222 of the second electrode pair (III).

The second connection anode 1321 of the second connection electrode pair (IV) is electrically connected to an adapter anode 1221 of the second electrode pair (IV), and the second connection cathode 1322 of the second connection electrode pair (IV) is electrically connected to an adapter cathode 1222 of the second electrode pair (IV).

By using the above connection method, the anodes and the cathodes of the light-emitting groups in the light bar 11 are led to the external connection unit 112, and are further led to the connection structure 13, and are further led to the adapter plate 12.

In some embodiments, the connection structure 13 is a converter, a flexible printed circuit (FPC), or a flexible flat cable (FFC). The external connection unit 112 and the adapter unit 122 may be pads or wiring terminals. The first connection unit 131 and the second connection unit 132 may be pins or wiring terminals respectively matched with the external connection unit 112 and the adapter unit 122.

Figure 8:
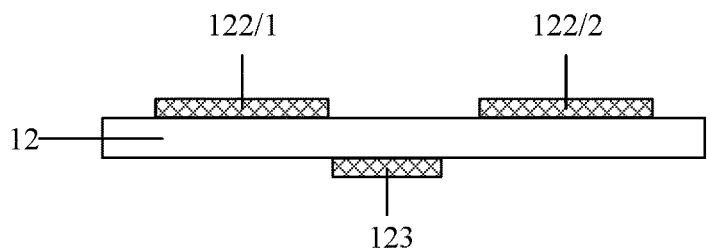
FIG. 8 is a side view of an adapter plate, in accordance with some embodiments.

In some embodiments, as shown in FIGS. 7 and 8, the adapter circuit 121 further includes a power supply connection unit 123, which is electrically connected to two adapter units 122 of the at least two adapter units 122 included in the adapter circuit 121. The power supply connection unit 123 is electrically connected to a driving circuit, and provides an electrical signal from the driving circuit to the backlight source 1, so as to control light-emitting devices 1111 in a corresponding dimming region M to emit light or not.

In some embodiments, as shown in FIG. 8, the at least two adapter units 122 and the power supply connection unit 123 are located on two opposite sides of the adapter plate 12 in a thickness direction thereof. In this way, it is possible to reasonably design wiring of the adapter plate 12, and to facilitate to reduce an area of the adapter plate 12. In addition, by designing the adapter circuit 121 on the adapter plate 12, several light bars 11 in electrical connection may be driven by using a single power supply connection unit 123, so that difficulty of designing the driving circuit may be significantly reduced, and the manufacturing costs may be further reduced.

It will be noted that, in a case where the adapter units 122 and the power supply connection unit 123 are located on the two opposite sides of the adapter plate 12 in the thickness direction thereof, the electrical connection between the adapter units 122 and the power supply connection unit 123 may be achieved by punching holes in the adapter plate 12, so that the adapter units 122 and the power supply connection unit 123 are electrically connected through via holes.

Figure 11:
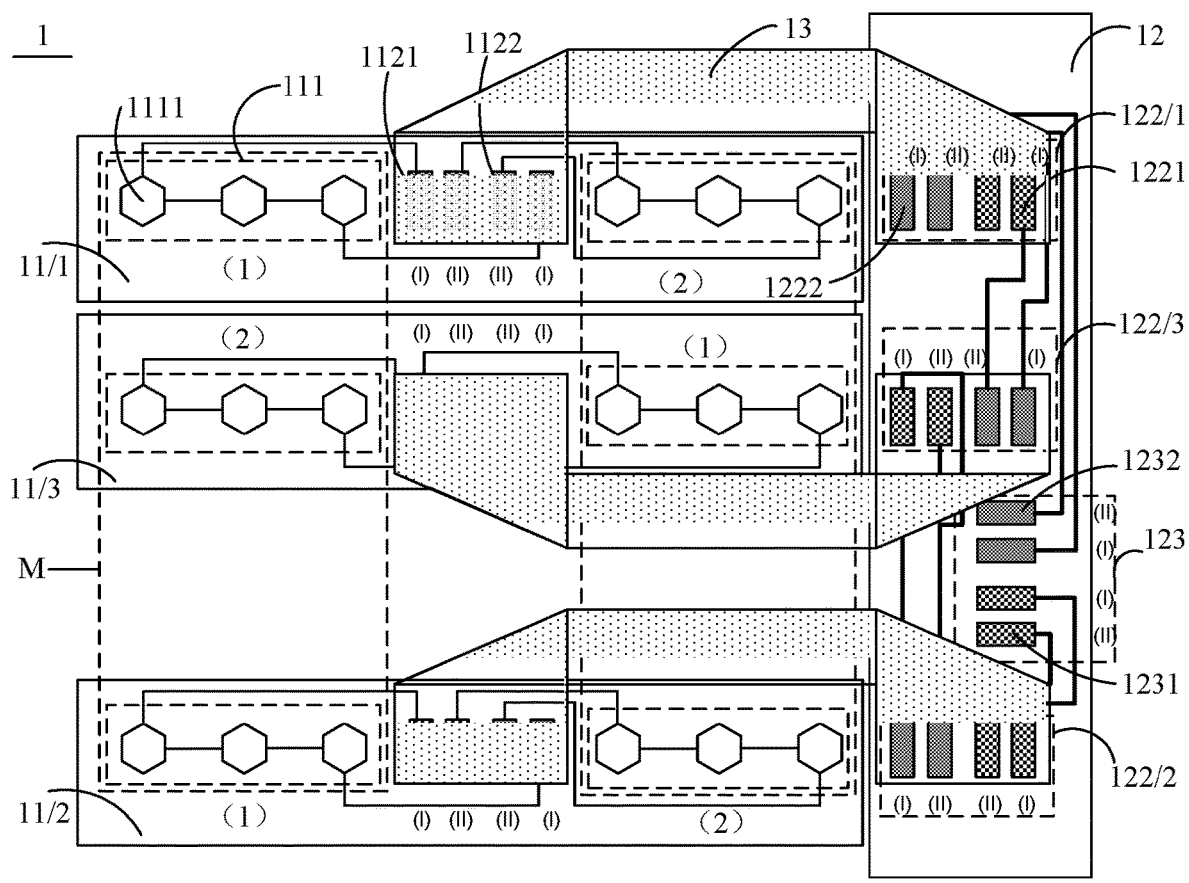
FIG. 11 is a diagram showing a structure of yet another backlight source, in accordance with some embodiments.

In order to achieve series connection between/among corresponding light-emitting groups 111 in light bars 11, in some embodiments, as shown in FIGS. 7 and 11, the two adapter units 122 electrically connected to the power supply connection unit 123 are a first adapter unit 122/1 and a second adapter unit 122/2. An adapter anode 1221 of a second electrode pair in the first adapter unit 122/1 is electrically connected to an adapter cathode 1222 of a corresponding second electrode pair in the second adapter unit 122/2.

In some embodiments, as shown in FIG. 7, the adapter circuit 121 includes two adapter units 122, which are a first adapter unit 122/1 and a second adapter unit 122/2, and the power supply connection unit 123 is electrically connected to the two adapter units 122. An adapter anode 1221 of each second electrode pair in the first adapter unit 122/1 is directly electrically connected to an adapter cathode 1222 of a corresponding second electrode pair in the second adapter unit 122/2.

For example, an adapter anode 1221 of a second electrode pair (I) of the first adapter unit 122/1 is electrically connected to an adapter cathode 1222 of a second electrode pair (I) of the second adapter unit 122/2.

An adapter anode 1221 of a second electrode pair (II) of the first adapter unit 122/1 is electrically connected to an adapter cathode 1222 of a second electrode pair (II) of the second adapter unit 122/2.

An adapter anode 1221 of a second electrode pair (III) of the first adapter unit 122/1 is electrically connected to an adapter cathode 1222 of a second electrode pair (III) of the second adapter unit 122/2.

An adapter anode 1221 of a second electrode pair (IV) of the first adapter unit 122/1 is electrically connected to an adapter cathode 1222 of a second electrode pair (IV) of the second adapter unit 122/2.

By using the above connection method, series connection between corresponding light-emitting groups 111 in two light bars 11 is achieved.

In some embodiments, the adapter circuit 121 includes three or more than three adapter units 122, that is, light-emitting groups 111 on three or more than three light bars 11 are connected in series. The two adapter units 122 electrically connected to the power supply connection unit 123 are a first adapter unit 122/1 and a second adapter unit 122/2. An adapter anode 1221 of each second electrode pair of the first adapter unit 122/1 is indirectly electrically connected to an adapter cathode 1222 of a corresponding second electrode pair of the second adapter unit 122/2 through light-emitting group(s) 111 in at least one light bar 11.

For example, as shown in FIG. 11, the adapter circuit 121 includes three adapter units 122, which are a first adapter unit 122/1, a second adapter unit 122/2 and a third adapter unit 122/3. The first adapter unit 122/1 and the second adapter unit 122/2 are electrically connected to the power supply connection unit 123.

The backlight source 1 includes three light bars 11, which are a first light bar 11/1, a second light bar 11/2 and a third light bar 11/3. Each light bar 11 includes two light-emitting groups 111 and one external connection unit 112. Each adapter unit 122 includes two second electrode pairs (I) and (II) in one-to-one correspondence with two light-emitting groups 111 electrically connected to the adapter unit 122, i.e., a first light-emitting group (1) and a second light-emitting group (2). Each second electrode pair includes an adapter anode 1221 and an adapter cathode 1222.

An adapter anode 1221 of each second electrode pair in the first adapter unit 122/1 is electrically connected to an adapter cathode 1222 of a corresponding second electrode pair in the second adapter unit 122/2 through a corresponding light-emitting group 111 on the third light bar 11/3.

For example, an adapter anode 1221 of a second electrode pair (I) of the first adapter unit 122/1 is electrically connected to an adapter cathode 1222 of a second electrode pair (II) of the third adapter unit 122/3, and an adapter anode 1221 of the second electrode pair (II) of the third adapter unit 122/3 is electrically connected to an adapter cathode 1222 of a second electrode pair (I) of the second adapter unit 122/2. That is, the adapter anode 1221 of the second electrode pair (I) of the first connection unit 122/1 is electrically connected to the adapter cathode 1222 of the second electrode pair (I) of the second adapter unit 122/2 through a second light-emitting group (2) on the third light bar 11/3.

An adapter anode 1221 of a second electrode pair (II) of the first connection unit 122/1 is electrically connected to an adapter cathode 1222 of a second electrode pair (I) of the third adapter unit 122/3, and an adapter anode 1221 of the second electrode pair (I) of the third adapter unit 122/3 is electrically connected to an adapter cathode 1222 of a second electrode pair (II) of the second adapter unit 122/2. That is, the adapter anode 1221 of the second electrode pair (II) of the first adapter unit 122/1 is electrically connected to the adapter cathode 1222 of the second electrode pair (II) of the second adapter unit 122/2 through a first light-emitting group (1) on the third light bar 11/3.

By using the above connection method, series connection among corresponding light-emitting groups 111 on the three light bars 11 is achieved.

In some embodiments, as shown in FIGS. 7 and 11, the power supply connection unit 123 includes at least one power supply electrode pair 1230 in one-to-one correspondence with at least one second electrode pair included in an adapter unit 122 electrically connected to the power supply connection unit 123. Each power supply electrode pair 1230 includes a power supply anode 1231 and a power supply cathode 1232. An adapter cathode 1222 of each second electrode pair of the first adapter unit 122/1 is electrically connected to a power supply cathode 1232 of a corresponding power supply electrode pair, and an adapter anode 1221 of each second electrode pair of the second adapter unit 122/2 is electrically connected to a power supply anode 1231 of a corresponding power supply electrode pair.

For example, as shown in FIG. 7, the power supply connection unit 123 includes four power supply electrode pairs (I), (II), (III) and (IV) in one-to-one correspondence with four second electrode pairs (I), (II), (III) and (IV) included in the adapter unit 122 electrically connected to the power supply connection unit 123. Each power supply electrode pair includes a power supply anode 1231 and a power supply cathode 1232.

An adapter cathode 1222 of the second electrode pair (I) of the first adapter unit 122/1 is electrically connected to a power supply cathode 1232 of a power supply electrode pair (I), and an adapter anode 1221 of the second electrode pair (I) of the second adapter unit 122/2 is electrically connected to a power supply anode 1231 of the power supply electrode pair (I).

An adapter cathode 1222 of the second electrode pair (II) of the first adapter unit 122/1 is electrically connected to a power supply cathode 1232 of a power supply electrode pair (II), and an adapter anode 1221 of the second electrode pair (II) of the second adapter unit 122/2 is electrically connected to a power supply anode 1231 of the power supply electrode pair (II).

An adapter cathode 1222 of the second electrode pair (III) of the first adapter unit 122/1 is electrically connected to a power supply cathode 1232 of a power supply electrode pair (III), and an adapter anode 1221 of the second electrode pair (III) of the second adapter unit 122/2 is electrically connected to a power supply anode 1231 of the power supply electrode pair (III).

An adapter cathode 1222 of the second electrode pair (IV) of the first adapter unit 122/1 is electrically connected to the power supply cathode 1232 of the power supply electrode pair (IV), and an adapter anode 1221 of the second electrode pair (IV) of the second adapter unit 122/2 is electrically connected to a power supply anode 1231 of the power supply electrode pair (IV).

Figure 5:
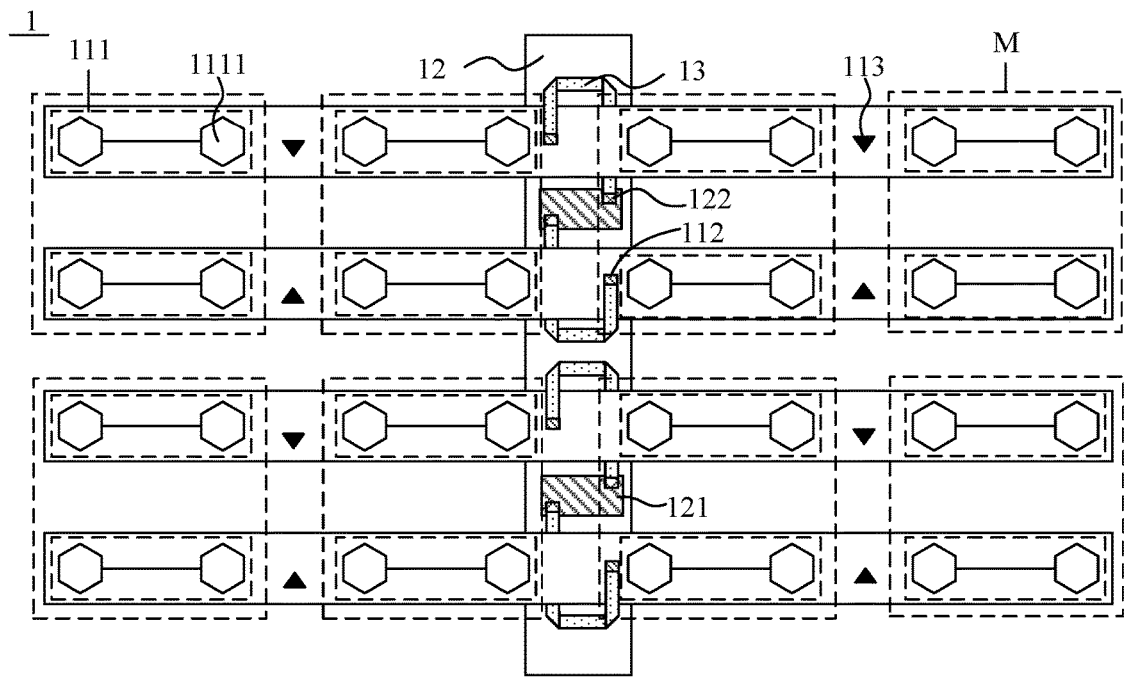
FIG. 5 is a diagram showing a structure of yet another backlight source, in accordance with some embodiments.

In some embodiments, as shown in FIGS. 4 to 5, the light-emitting groups 111 electrically connected to the adapter units 122 of the same adapter circuit 121 are distributed in at least two adjacent light bars 11 in the second direction Y. In this way, the dimming region M formed by connecting the light-emitting groups 111 in series has a continuous pattern, such as a rectangular shape, which facilitates to simplify wirings on the light bars 11, the connection structures 13 and the adapter plate 12.

For example, as shown in FIGS. 4 to 5, the light-emitting groups 111 electrically connected to the adapter units 122 of the same adapter circuit 121 are distributed in two adjacent light bars 11 in the second direction Y. That is, in the second direction Y, a first light bar 11 and a second light bar 11 are electrically connected to two adapter units 122 of a first adapter circuit 121, and a third light bar 11 and a fourth light bar 11 are electrically connected to two adapter units 122 of a second adapter circuit 121.

For example, the light-emitting groups 111 electrically connected to the adapter units 122 of the same adapter circuit 121 are distributed in a plurality of adjacent light bars 11 in the second direction Y. For example, as shown in FIG. 11, the light-emitting groups 111 electrically connected to the adapter units 122 of the same adapter circuit 121 are distributed in three adjacent light bars 11 in the second direction Y. That is, in the second direction Y, a first light bar 11, a second light bar 11 and a third light bar 11 are electrically connected to three adapter units 122 of the same adapter circuit 121.

In some embodiments, the light-emitting devices 1111 are light-emitting diodes (LED chips). During manufacturing of the LED chips, there may be a difference in color blocks of LEDs on a same wafer. A color block refers to a range of a color temperature. That is, there may be a difference in ranges of color temperatures of colors of light emitted by the LEDs on the same wafer. Based on this, as shown in FIGS. 1 to 5, in a same light bar 11, colors of light emitted by adjacent light-emitting devices 1111 are different. In this way, not only the light-emitting diodes provided by a manufacturer may be fully utilized, but also a color mixing effect may be achieved by making LED chips with different color blocks as the adjacent light-emitting devices 1111, so that average color temperatures of light emitted from respective dimming regions M when driven by a same driving signal are substantially the same. As a result, the manufacturing costs may be reduced, and the display effect may be ensured.

In some embodiments, as shown in FIG. 4, fixing directions of two adjacent light bars 11 are the same. In this case, the number of light-emitting devices 1111 included in each light bar 11 is not limited. M light-emitting devices 1111 included in each light-emitting group 111 are provided, and M may be 2, 3, 4, etc. N light-emitting groups 111 included in each light bar 11 are provided, and N may be 1, 2, 3, etc. In this case, M by N light-emitting devices 1111 are provided in each light bar 11. For example, four, six, eight or nine light-emitting devices 1111 may be provided in each light bar 11.

In some embodiments of the present disclosure, as shown in FIG. 5, in a plane where the backlight source 1 is located, fixing directions of two adjacent light bars 11 differ by 180°.

Figure 12:
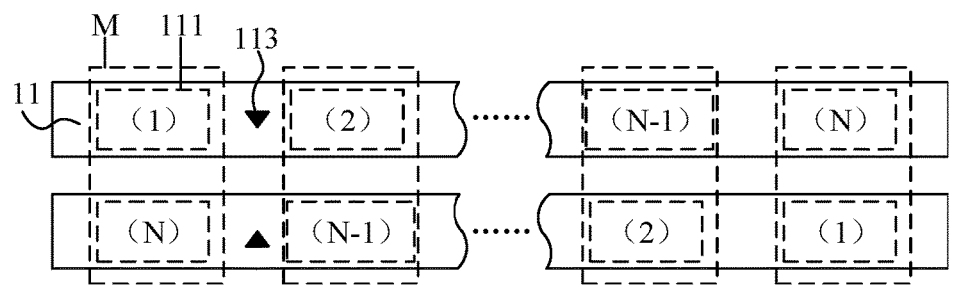
FIG. 12 is a diagram showing structures of two adjacent light bars in a backlight source, in accordance with some embodiments.

For example, as shown in FIG. 12, the description that the fixing directions of two adjacent light bars 11 differ by 180° means that, assuming that the light-emitting groups 111 on each light bar 11 are sequentially numbered as 1 to N from left to right, in two adjacent light bars 11, a first light bar 11 is fixed in a forward direction, and a second light bar 11 is fixed after being rotated by 180°. In this way, in a column direction, a first light-emitting group 111 of the first light bar 11 corresponds to an Nth light-emitting group 111 of the second light bar 11, a second light-emitting group 111 of the first light bar 11 corresponds to an (N−1)th light-emitting group 111 of the second light bar 11, . . . , and an Nth light-emitting group 111 of the first light bar 11 corresponds to a first light-emitting group 111 of the second light bar 11. It can be seen therefrom that, a sum of serial numbers of light-emitting groups 111 in a same column is N plus 1 (i.e., N+1).

Colors of light emitted by light-emitting devices 1111 at a same position (i.e., located in a same column along a second direction) in light bars 11 are the same (e.g., colors of light emitted by third light-emitting devices 1111 from left to right in the light bars 11 being the same). In addition, colors of light emitted by two adjacent light-emitting devices 1111 in the same light bar 11 are different. On a premise that the number of the light-emitting devices 1111 included in each light bar 11 is an even number, the fixing directions of two adjacent light bars 11 differ by 180°, so that colors of light emitted by light-emitting devices 111 at the same position (i.e., located in the same column in the second direction Y) in two adjacent light bars 11 may be different.

For example, from top to bottom, since the number of the light-emitting devices 1111 on each light bar 11 is an even number, a color of light emitted by a first light-emitting device 1111 in the first light bar 11 is different from a color of light emitted by a last light-emitting device 111 in the second light bar 11. The second light bar 11 is fixed after being rotated by 180°, and colors of light emitted by two adjacent light-emitting devices 1111 in the same column (the first light-emitting device 1111 of the first light bar 11 and the last light-emitting device 1111 of the second light bar 11) are different, so that the color mixing may be further achieved, and the display effect may be ensured.

Moreover, the backlight source 1 relates to light bars of only one specification, It is possible to effectively reduce an assembly difficulty and prevent installation errors compared with a method of achieving color mixing by using light bars of multiple different specifications.

In some embodiments, the light bar 11 further includes a direction mark 113. The fixing direction of the light bar 11 is determined through the direction mark 113, and directions indicated by direction marks 113 of two adjacent light bars 11 are opposite. In this way, it is possible to facilitate to achieve assembly of the light bars 11 and the adapter plate(s) 12, which may significantly reduce the assembly difficulty, and effectively prevent the installation errors.

Preventing the installation errors may further reduce the manufacturing costs. Since for some connection structures 13, once a connection unit of the connection structure 13 is bound to a light bar 11 or an adapter plate, damage will be caused if the connection unit is disassembled from the light bar 11 or the adapter plate. As a result, whether the corresponding light bar 11, adapter plate 12 and connection structure 13 may be repaired or may no longer be used, the costs will increases.

For example, as shown in FIGS. 1 to 3, the direction mark 113 is a triangle, and the fixing direction of the light bar 11 may be easily determined through the triangular direction mark 113. Of course, the direction mark 113 may also be another pattern or letter. For example, the direction mark 113 may be a letter such as "A", "F" or "M", and the fixing direction of the light bar 11 may also be easily determined. The direction mark 113 may be formed on a surface of the light bar by means of printing, spraying, etching, etc., as long as the direction mark 113 is easy to be identified and does not affect a function of the light bar 11.

As shown in FIGS. 1 to 4, in the backlight source 1 provided by some embodiments of the present disclosure, the smaller the number of the adapter units 122 included in each adapter circuit 121 is, the smaller the number of the light-emitting groups 111 connected in series is, and the smaller the number of the light-emitting devices 1111 in each light-emitting group 111 is, the smaller the number of the light-emitting devices 1111 in each dimming region M is, that is, the smaller an area of each dimming region M is, and the better a local dimming effect is. The greater the number of the adapter units 122 included in each adapter circuit 121 is, the greater the number of the light-emitting groups 111 connected in series is, and the greater the number of the light-emitting devices 1111 in each light-emitting group 111 is, the greater the number of the light-emitting devices 1111 in each dimming region M is, that is, the larger the area of each dimming region M is, and the lower the difficulty of designing the driving circuit is, which is more beneficial to reducing the manufacturing costs. Therefore, in practical applications, the number of the light-emitting devices 1111 in the light-emitting group 111 and the number of the adapter units 122 included in the adapter circuit may be designed according to specific display requirements of the display apparatus, so as to control the manufacturing costs while ensuring the display effect.

Figure 13:
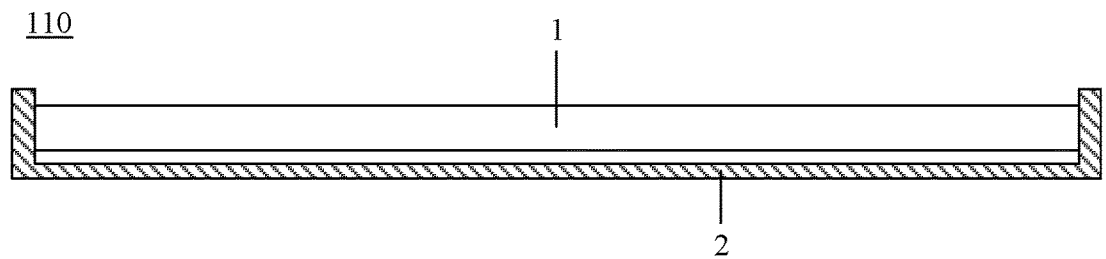
FIG. 13 is a diagram showing a structure of a backlight module, in accordance with some embodiments.

Some embodiments of the present disclosure provide a backlight module. As shown in FIG. 13, the backlight module 110 includes the backlight source 1 in the above embodiments, and may achieve beneficial effects of the backlight source 1 in the above embodiments, and details will not be repeated herein.

As shown in FIG. 13, the backlight module 110 provided by some embodiments of the present disclosure further includes a back frame 2, and the backlight source 1 is located in the back frame 2.

Figure 14:
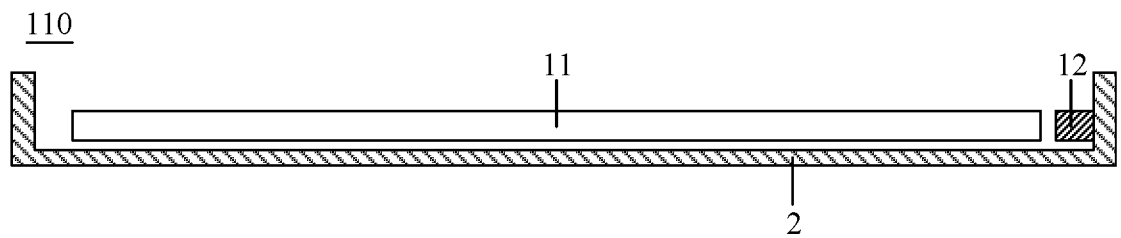
FIG. 14 is a diagram showing a structure of another backlight module, in accordance with some embodiments.
Figure 15:
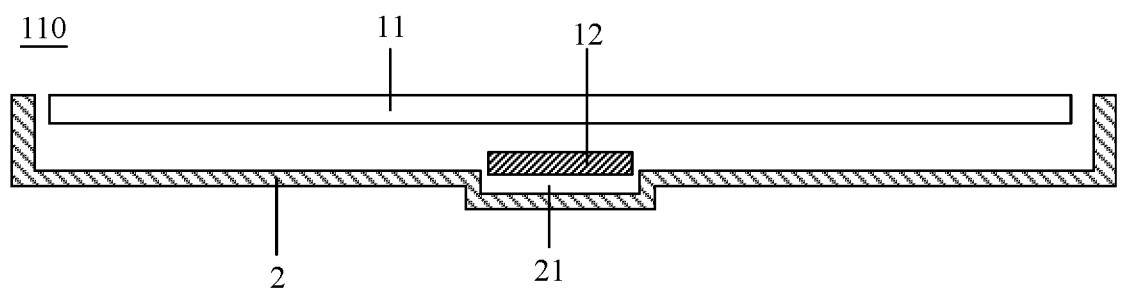
FIG. 15 is a diagram showing a structure of yet another backlight module, in accordance with some embodiments.

As shown in FIG. 14, the adapter plate 12 may be located on a side of the light bars 11. As shown in FIG. 15, the adapter plate 12 may be located under the light bars 11.

Figure 16:
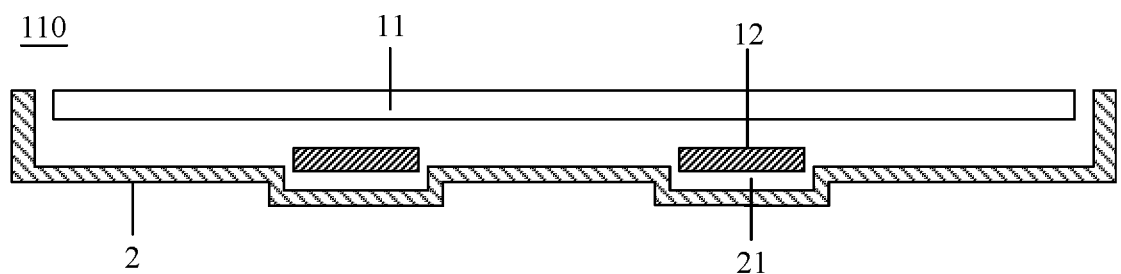
FIG. 16 is a diagram showing a structure of yet another backlight module, in accordance with some embodiments.

In some embodiments, as shown in FIGS. 15 and 16, in a case where the at least one adapter plate 12 of the backlight source 1 is located under the plurality of light bars 11 of the backlight source 1, the back frame 2 includes at least one groove 21, and the at least one adapter plate 12 is located in the at least one groove. In this way, it is possible not only to facilitate to reduce thicknesses of regions of the backlight module except the groove 21, but also to prevent the adapter plate 12 from shifting.

For example, as shown in FIG. 15, the backlight source 1 includes one adapter plate 12, which is located under the plurality of light bars 11. In this case, the back frame 2 is designed with one groove 21 matched with a shape of the adapter plate 12, and the adapter plate 12 may be placed in the groove 21.

For example, the backlight source 1 includes a plurality of adapter plates 12. For example, as shown in FIG. 16, the backlight source includes two adapter plates 12, which are located under the plurality of light bars 11. In this case, the back frame 2 is designed with two grooves 21 matched with a shape of the adapter plates 12, and the two adapter plates are placed in the two grooves 21.

Figure 17:
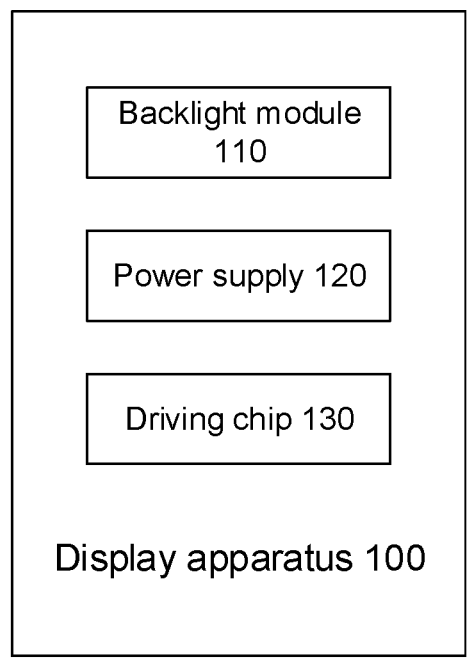
FIG. 17 is a framework diagram of a display apparatus, in accordance with some embodiments.

Some embodiments of the present disclosure provide a display apparatus 100. As shown in FIG. 17, the display apparatus 100 includes the backlight module 110 in the above embodiments, and may achieve beneficial effects of the backlight module 110 in the above embodiments, and details will not be repeated herein.

In some embodiments, the display apparatus further includes a power supply 120 and a driving chip 130. The driving chip 130 includes a driving circuit for driving the backlight source 1 in the backlight module 110. The driving circuit is electrically connected to the power supply 120, and controls the power supply 120 to provide electrical signals for the backlight source 1, so as to make the backlight source 1 emit light, thereby providing required backlight for the display apparatus 100.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A backlight source, comprising:
a plurality of light bars, each light bar including:
at least one light-emitting group, each light-emitting group including at least two light-emitting devices connected in series; and
at least one external connection unit, each external connection unit being electrically connected to at least one light-emitting group in the light bar; the external connection unit including at least one first electrode pair in one-to-one correspondence with the at least one light-emitting group electrically connected to the external connection unit;
at least one adapter plate, each adapter plate including a plurality of adapter circuits, and each adapter circuit including:
at least two adapter units in electrical connection; each adapter unit including at least one second electrode pair in one-to-one correspondence with the at least one first electrode pair; and
a plurality of connection structures, each connection structure corresponding to one external connection unit and one adapter unit in an adapter circuit, an end of the connection structure being electrically connected to the corresponding external connection unit, and another end thereof being electrically connected to the corresponding adapter unit, so that the at least one light-emitting group electrically connected to each first electrode pair of the external connection unit is electrically connected to a corresponding second electrode pair of the adapter unit, wherein
second electrode pairs of at least two adapter units of a same adapter circuit are classified into at least one group, each group includes at least two second electrode pairs that are electrically connected in series in sequence, each of the at least two second electrode pairs is from a respective adapter unit; in light-emitting groups electrically connected to the at least two adapter units of the same adapter circuit, light-emitting groups electrically connected to at least two second electrode pairs in a same group are connected in series to form a dimming region.

2. The backlight source according to claim 1, wherein the light-emitting group has an anode terminal and a cathode terminal;
each first electrode pair includes an external connection anode and an external connection cathode;
the anode terminal of the light-emitting group is electrically connected to an external connection anode of a corresponding first electrode pair, and the cathode terminal of the light-emitting group is electrically connected to an external connection cathode of the corresponding first electrode pair.

3. The backlight source according to claim 1, wherein the connection structure includes a first connection unit and a second connection unit electrically connected to the first connection unit;
the first connection unit is electrically connected to the corresponding external connection unit, and the second connection unit is electrically connected to the corresponding adapter unit.

4. The backlight source according to claim 3, wherein each second electrode pair includes an adapter anode and an adapter cathode;
the first connection unit includes at least one first connection electrode pair in one-to-one correspondence with the at least one first electrode pair included in the corresponding external connection unit, and each first connection electrode pair includes a first connection anode and a first connection cathode;
the second connection unit includes at least one second connection electrode pair in one-to-one correspondence with the at least one second electrode pair included in the corresponding adapter unit, and each second connection electrode pair includes a second connection anode and a second connection cathode;
the first connection anode of the first connection electrode pair is electrically connected to a second connection anode of a corresponding second connection electrode pair, and the first connection cathode of the first connection electrode pair is electrically connected to a second connection cathode of the corresponding second connection electrode pair;
the first connection anode of the first connection electrode pair is electrically connected to an external connection anode of a corresponding first electrode pair, and the first connection cathode of the first connection electrode pair is electrically connected to an external connection cathode of the corresponding first electrode pair;
the second connection anode of the second connection electrode pair is electrically connected to an adapter anode of a corresponding second electrode pair, and the second connection cathode of the second connection electrode pair is electrically connected to an adapter cathode of the corresponding second electrode pair.

5. The backlight source according to claim 1, wherein the adapter circuit further includes a power supply connection unit, and two adapter units of the at least two adapter units included in the adapter circuit are electrically connected to the power supply connection unit;
the power supply connection unit is configured to control light-emitting devices in the dimming region to emit light.

6. The backlight source according to claim 5, wherein the power supply connection unit and the at least two adapter units are disposed on two opposite sides of an adapter plate including the power supply connection unit in a thickness direction thereof.

7. The backlight source according to claim 5, wherein each second electrode pair includes an adapter anode and an adapter cathode,
the power supply connection unit includes at least one power supply electrode pair in one-to-one correspondence with at least one second electrode pair included in any of the two adapter units electrically connected to the power supply connection unit, and each power supply electrode pair includes a power supply anode and a power supply cathode;

the two adapter units electrically connected to the power supply connection unit are a first adapter unit and a second adapter unit;

an adapter anode of a second electrode pair in the first adapter unit is electrically connected to an adapter cathode of a corresponding second electrode pair in the second adapter unit;

the power supply cathode of the power supply electrode pair is electrically connected to an adapter cathode of a corresponding second electrode pair in the first adapter unit, and the power supply anode of the power supply electrode pair is electrically connected to an adapter anode of a corresponding second electrode pair in the second adapter unit.

8. The backlight source according to claim 1, wherein each light bar extends in a first direction, and the plurality of light bars are arranged in a second direction; the first direction intersects with the second direction;

the adapter plate extends in the second direction;

the adapter plate is located under the plurality of light bars, or the adapter plate is located on a side of the plurality of light bars in the first direction.

9. The backlight source according to claim 8, wherein the light-emitting groups electrically connected to the at least two adapter units of the same adapter circuit are arranged in at least two light bars that are adjacent in the second direction.

10. The backlight source according to claim 8, wherein the light bar includes at least one light segment, and each light segment includes the at least one light-emitting group electrically connected to an external connection unit;

each light segment corresponds to the external connection unit;

the external connection unit is disposed in a middle of the corresponding light segment in the first direction.

11. The backlight source according to claim 8, wherein the light-emitting group has an anode terminal and a cathode terminal; the light-emitting group further includes a first connection line and a second connection line;

the anode terminal of the light-emitting group is electrically connected to a corresponding external connection unit through the first connection line, and the cathode terminal of the light-emitting group is electrically connected to the corresponding external connection unit through the second connection line;

the at least one light-emitting group electrically connected to a same external connection unit includes a plurality of light-emitting groups, sectional areas of a first connection line and a second connection line of a light-emitting group closer to the external connection unit are smaller.

12. The backlight source according to claim 1, wherein the light-emitting devices are light-emitting diodes, and in a same light bar, colors of light emitted by two adjacent light-emitting devices are different.

13. The backlight source according to claim 12, wherein in a plane where the backlight source is located, fixing directions of two adjacent light bars differ by 180°.

14. The backlight source according to claim 13, wherein each light bar further includes a direction mark disposed on a surface of the light bar, and directions indicated by direction marks of the two adjacent light bars are opposite.

15. The backlight source according to claim 13, wherein colors of light emitted by light-emitting devices, located in a same column along a second direction, in the two adjacent light bars are different, the second direction is a direction in which the plurality of light bars are arranged.

16. The backlight source according to claim 13, wherein a number of light-emitting devices included in each light bar is an even number.

17. The backlight source according to claim 1, wherein the connection structure is a converter, a flexible printed circuit, or a flexible flat cable.

18. A backlight module, comprising the backlight source according to claim 1 and a back frame, the backlight source being located in the back frame.

19. A display apparatus, comprising the backlight module according to claim 18.

20. The backlight module according to claim 18, wherein the at least one adapter plate of the backlight source is located under the plurality of light bars of the backlight source; the back frame includes at least one depression, and each adapter plate is located in a corresponding depression.

* * * * *